United States Patent
Mickols et al.

(10) Patent No.: US 10,046,343 B2
(45) Date of Patent: Aug. 14, 2018

(54) ALTERNATOR INDICATOR FOR ELECTROSTATIC SPRAY GUN

(71) Applicant: Graco Minnesota Inc., Minneapolis, MN (US)

(72) Inventors: Adriana Fitzgerald Mickols, Fridley, MN (US); Joseph A. Daniski, Minnetonka, MN (US); Mark E. Ulrich, Oak Grove, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 471 days.

(21) Appl. No.: 14/432,372

(22) PCT Filed: Sep. 30, 2013

(86) PCT No.: PCT/US2013/062647
§ 371 (c)(1),
(2) Date: Mar. 30, 2015

(87) PCT Pub. No.: WO2014/055419
PCT Pub. Date: Apr. 10, 2014

(65) Prior Publication Data
US 2015/0251199 A1    Sep. 10, 2015

Related U.S. Application Data

(60) Provisional application No. 61/708,143, filed on Oct. 1, 2012.

(51) Int. Cl.
*H02K 11/00*    (2016.01)
*B05B 5/025*    (2006.01)
(Continued)

(52) U.S. Cl.
CPC ............ *B05B 5/025* (2013.01); *B05B 5/0532* (2013.01); *B05B 12/08* (2013.01); *H02K 29/08* (2013.01); *B05B 12/004* (2013.01)

(58) Field of Classification Search
CPC ............ B05B 1/20; B05B 5/025; H02K 29/08
(Continued)

(56) References Cited

U.S. PATENT DOCUMENTS 4,219,865 A    8/1980    Malcolm
4,462,061 A    7/1984    Mommsen
(Continued)

FOREIGN PATENT DOCUMENTS

CN    1953811 A    4/2007
EP    0847807 A2    6/1998
(Continued)

OTHER PUBLICATIONS

Second Chinese Office Action, for Chinese PAtent Application No. 201380051113.8, dated Dec. 2, 2016, 15 pages.
(Continued)

*Primary Examiner* — Hanh Nguyen
(74) *Attorney, Agent, or Firm* — Kinney & Lange, P.A.

(57) ABSTRACT

In one example, an electrostatic spray gun includes a spray tip assembly, an alternator, an electrode, and at least one controller. The alternator includes a stator having an inner diameter and an outer diameter. The alternator further includes a rotor disposed within the inner diameter of the stator and configured to rotate within the stator to cause the alternator to generate alternating electrical current. The electrode, positioned proximate the spray tip assembly, is coupled to receive electrical energy from the alternator. The at least one controller is coupled to the alternator and is configured to output a representation of a rotational speed of the rotor.

21 Claims, 6 Drawing Sheets

(51) Int. Cl.
*H02K 29/08* (2006.01)
*B05B 5/053* (2006.01)
*B05B 12/08* (2006.01)
*B05B 12/00* (2018.01)

(58) Field of Classification Search
USPC .......................................... 310/68 B; 239/692
See application file for complete search history.

(56) References Cited

U.S. PATENT DOCUMENTS

| | | | |
|---|---|---|---|
| 4,491,276 A | 1/1985 | Reeves | |
| 5,073,709 A | 12/1991 | Lunzer et al. | |
| 5,080,289 A | 1/1992 | Lunzer | |
| 5,658,385 A | 8/1997 | Tsutsui et al. | |
| 5,814,914 A * | 9/1998 | Caamano | H02K 1/02 310/179 |
| 2004/0195405 A1 | 10/2004 | Healy | |
| 2005/0242205 A1 | 11/2005 | Jarvis | |
| 2007/0240641 A1 | 10/2007 | Lind | |
| 2009/0224076 A1 | 9/2009 | Altenburger | |
| 2014/0091648 A1* | 4/2014 | Kumagai | B25F 5/02 310/50 |

FOREIGN PATENT DOCUMENTS

| | | |
|---|---|---|
| JP | H04326957 A | 11/1992 |
| JP | 2005501715 A | 1/2005 |
| JP | 2011513065 A | 4/2011 |
| JP | 2012011329 A | 1/2012 |
| JP | 2012086142 A | 5/2012 |
| KR | 2008046756 A | 5/2008 |
| RU | 2268777 C2 | 1/2006 |
| WO | WO03022449 A1 | 3/2003 |
| WO | WO2009114276 A1 | 9/2009 |

OTHER PUBLICATIONS

Extended European Search Report for European Patent Application No. 13843465.9, dated Jun. 1, 2016, 6 pages.
First Chinese Office Action for Chinese Patent Application No. 201380051113.8, dated May 24, 2016, 18 pages.
Office Action from Taiwan Application Serial No. 102135751, dated Mar. 6, 2017, 12 Pages.
Office Action from Ukraine Application No. a 2015 02927, dated Apr. 24, 2017, 14 pages.
Russian Office Action for Russian Patent Application No. 2015116259, dated Aug. 16, 2017, 14 pages.
Third Chinese Office Action for Chinese Patent Application No. 201380051113.8, dated Jun. 2, 2017, 7 pages.
Japanese Office Action for Japanese Patent Application No. 2015534794, dated Sep. 27, 2017, 8 pages.
Ukrainian Office Action for Ukrainian Patent Application No. a 2015 02927, dated Dec. 21, 2017, 10 pages.

* cited by examiner

ALTERNATOR INDICATOR FOR ELECTROSTATIC SPRAY GUN

CROSS-REFERENCE TO RELATED APPLICATION(S)

This application claims benefit to International Application No. PCT/US2013/062647filed Sep. 30, 2013 entitled "ALTERNATOR INDICATOR FOR ELECTROSTATIC SPRAY GUN" and claims benefit of Provisional Application No. 61/708,143, filed Oct. 1, 2012entitled "ALTERNATOR INDICATOR FOR ELECTROSTATIC SPRAY GUN", which is incorporated herein.

BACKGROUND

The present invention relates generally to applicators that are used to spray fluids, such as paint, sealants, coatings, enamels, adhesives, powders and the like. More particularly, the invention relates to electrostatic spray guns.

In electrostatic spray systems, an electrostatic field is produced in the vicinity between the spray gun and the target or article to be sprayed. The sprayed particles are propagated through this field, and the respective particles pick up electrical charges as they pass through the field. The charged particles are thereby attracted to the article to be sprayed. By this process, it is possible to direct a much higher percentage of sprayed particles to the actual article to be sprayed, and thereby the efficiency of spraying is vastly improved over conventional methods. Electrostatic spray guns are particularly useful for applying non-conductive liquids and powders, although they may be used in connection with spraying conductive liquids.

In a typical electrostatic spraying system, an ionizing electrode is placed in the vicinity of the spray gun spray orifice, the article to be painted is held at ground potential, and an electrostatic field is developed between the ionizing electrode and the article. The distance between the electrode and ground may be on the order of about 0.5 meters or less; therefore, the voltage applied to the spray gun electrode must necessarily be quite high in order to develop an electrostatic field of sufficient intensity to create a large number of ion/particle interactions so as to develop a sufficient attractive force between the paint particles and the target. It is not unusual to apply electrostatic voltages on the order of 20,000-100,000 volts (20-100 kV) to the spray gun electrode in order to achieve a proper degree of efficiency in the spraying operation. An ionizing current on the order of 50 micro-amps typically flows from the spray gun electrode.

Electrostatic spray guns may be hand-held spray guns or automatic spray guns operable by remote control connections. The sprayed fluid may be atomized using different primary atomizing forces, such as pressurized air, hydraulic forces, or centrifugal forces. Power for the electrostatic voltage may be generated in a variety of ways. In many systems, an external power source is connected to the electrostatic spray gun. However, in other designs, power may be generated with an alternator located in the electrostatic spray gun. For example, U.S. Pat. Nos. 4,554,622, 4,462,061, 4,290,091, 4,377,838, 4,491,276 and 7,226,004 describe electrostatic spray guns having an air-powered turbine which drives an alternator that in turn supplies a voltage multiplier to provide the charging voltage.

SUMMARY

In one example, an electrostatic spray gun includes a spray tip assembly and an alternator. The alternator includes a stator having an inner diameter and an outer diameter, and a rotor disposed within the inner diameter of the stator and configured to rotate within the stator to cause the alternator to generate alternating electrical current. The electrostatic spray gun further includes an electrode coupled to receive electrical energy from the alternator. The electrode is positioned proximate the spray tip assembly. The electrostatic spray gun further includes at least one controller coupled to the alternator, the at least one controller configured to output a representation of a rotational speed of the rotor.

In another example, an electrostatic spray gun includes a housing and an air-driven alternator disposed within the housing. The alternator includes a stator having an inner diameter and an outer diameter, and a rotor disposed within the inner diameter of the stator and configured to rotate within the stator to cause the alternator to generate alternating electrical current. The electrostatic spray gun further includes a spray tip assembly and an electrode coupled to receive electrical energy from the alternator. The electrode is positioned proximate the spray tip assembly. The electrostatic spray gun further includes an indicator configured to output a representation of a rotational speed of the rotor.

In another example, an electrostatic spray gun includes a spray tip assembly and an alternator. The alternator includes a stator having an inner diameter and an outer diameter, and a rotor disposed within the inner diameter of the stator and configured to rotate within the stator to cause the alternator to generate alternating electrical current. The electrostatic spray gun further includes an electrode coupled to receive electrical energy from the alternator. The electrode is positioned proximate the spray tip assembly. The electrostatic spray gun further includes an indicator configured to output an indication that an operating condition of the alternator corresponds to a suboptimal operating condition for electrostatic spraying.

DETAILED DESCRIPTION

Figure 1:
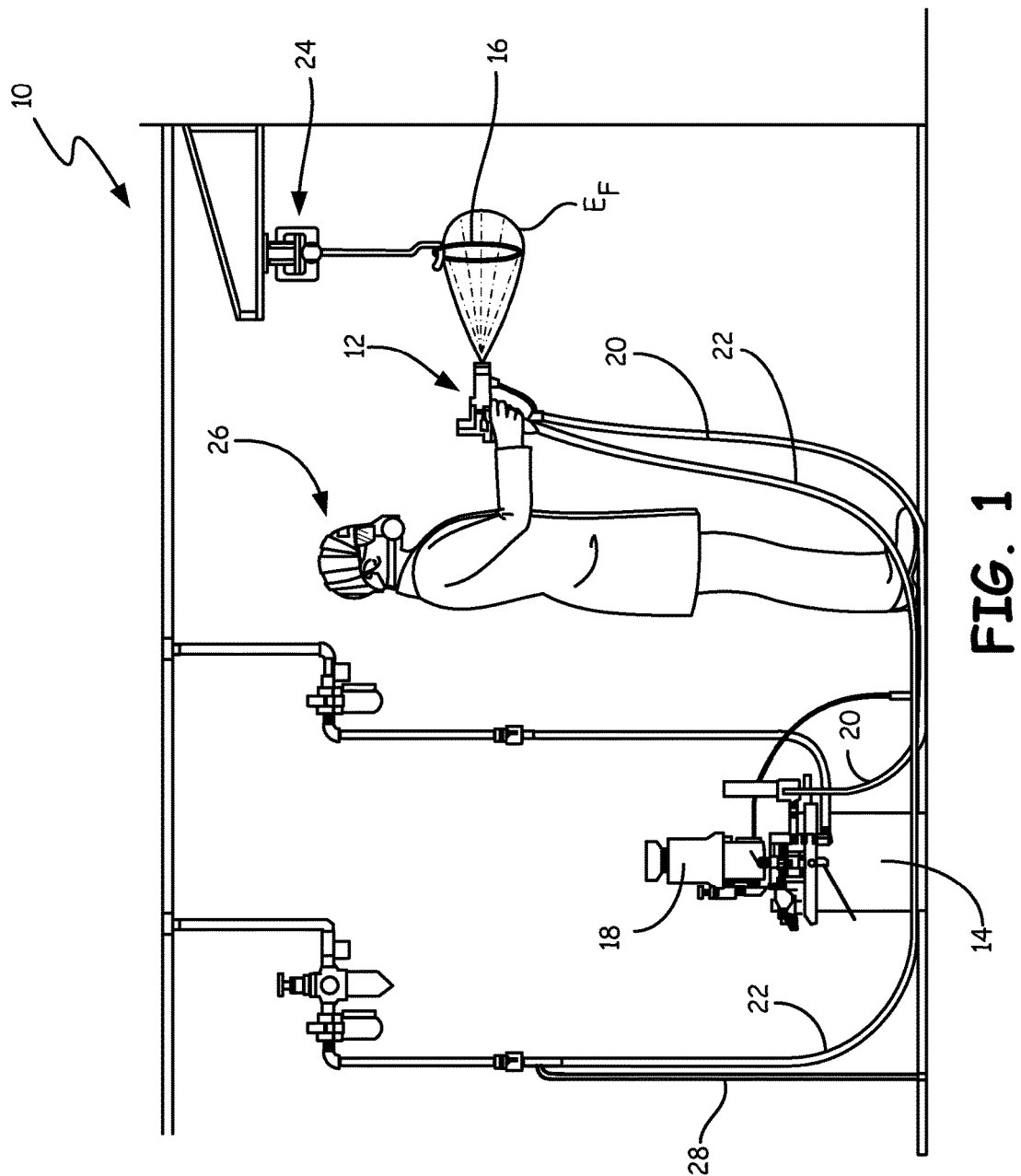
FIG. 1 is a schematic of an electrostatic spray system showing an electrostatic spray gun connected to a fluid supply and discharging onto a target.
Figure 2:
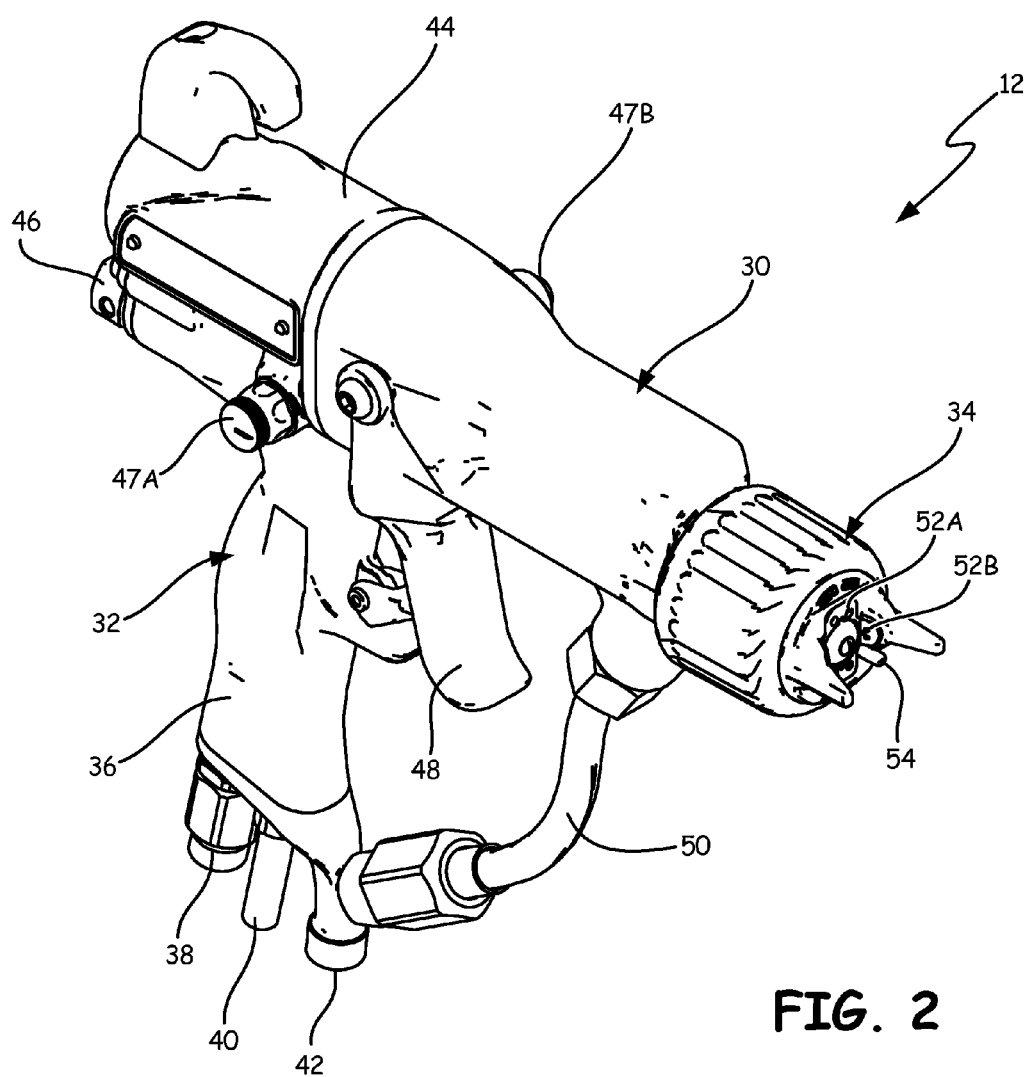
FIG. 2 is a perspective view of the electrostatic spray gun of FIG. 1 showing a gun barrel connected to a handle body and a spray tip assembly.
Figure 3:
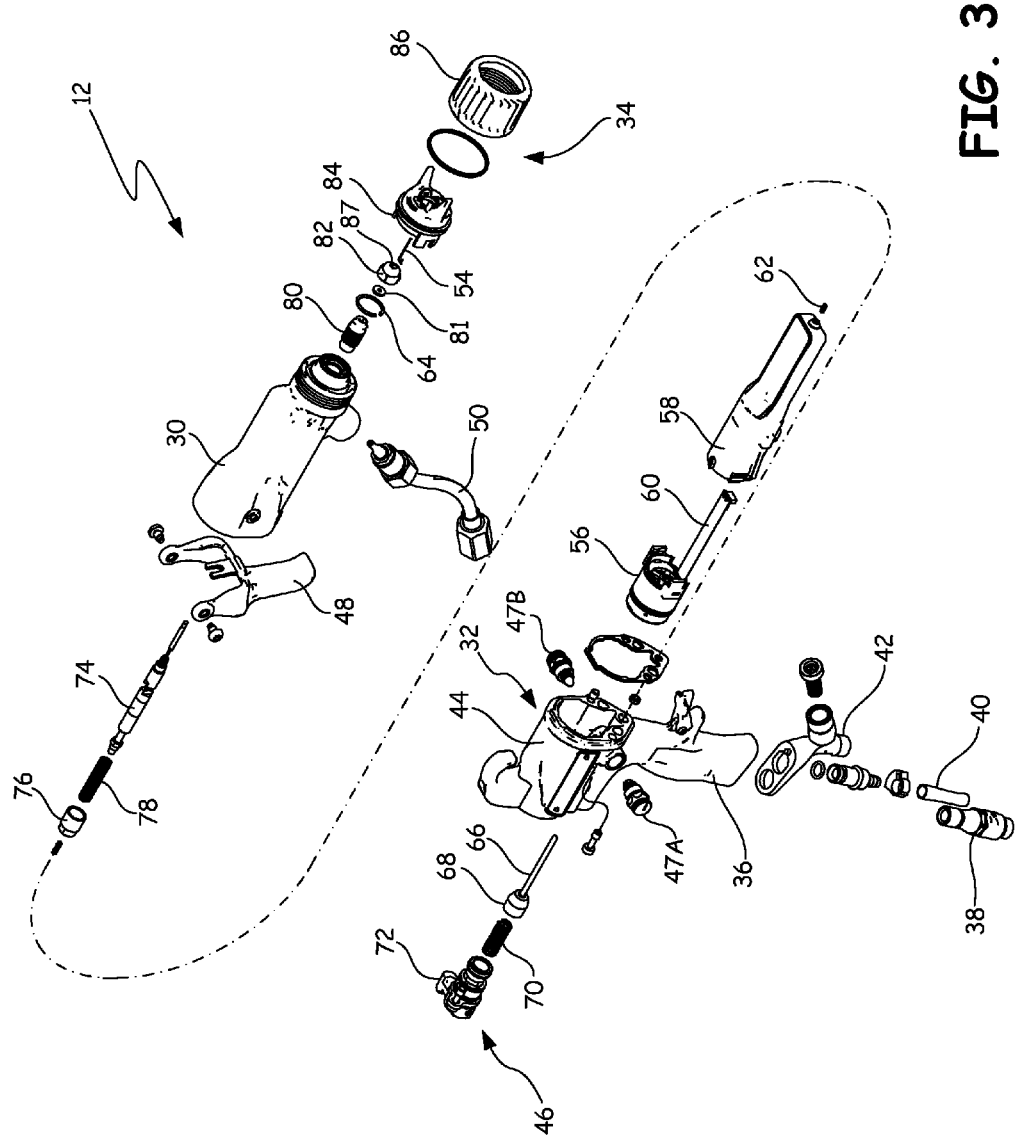
FIG. 3 is an exploded view of the electrostatic spray gun of FIG. 2 showing an alternator and a power supply configured to be located within the gun body.
Figure 4:
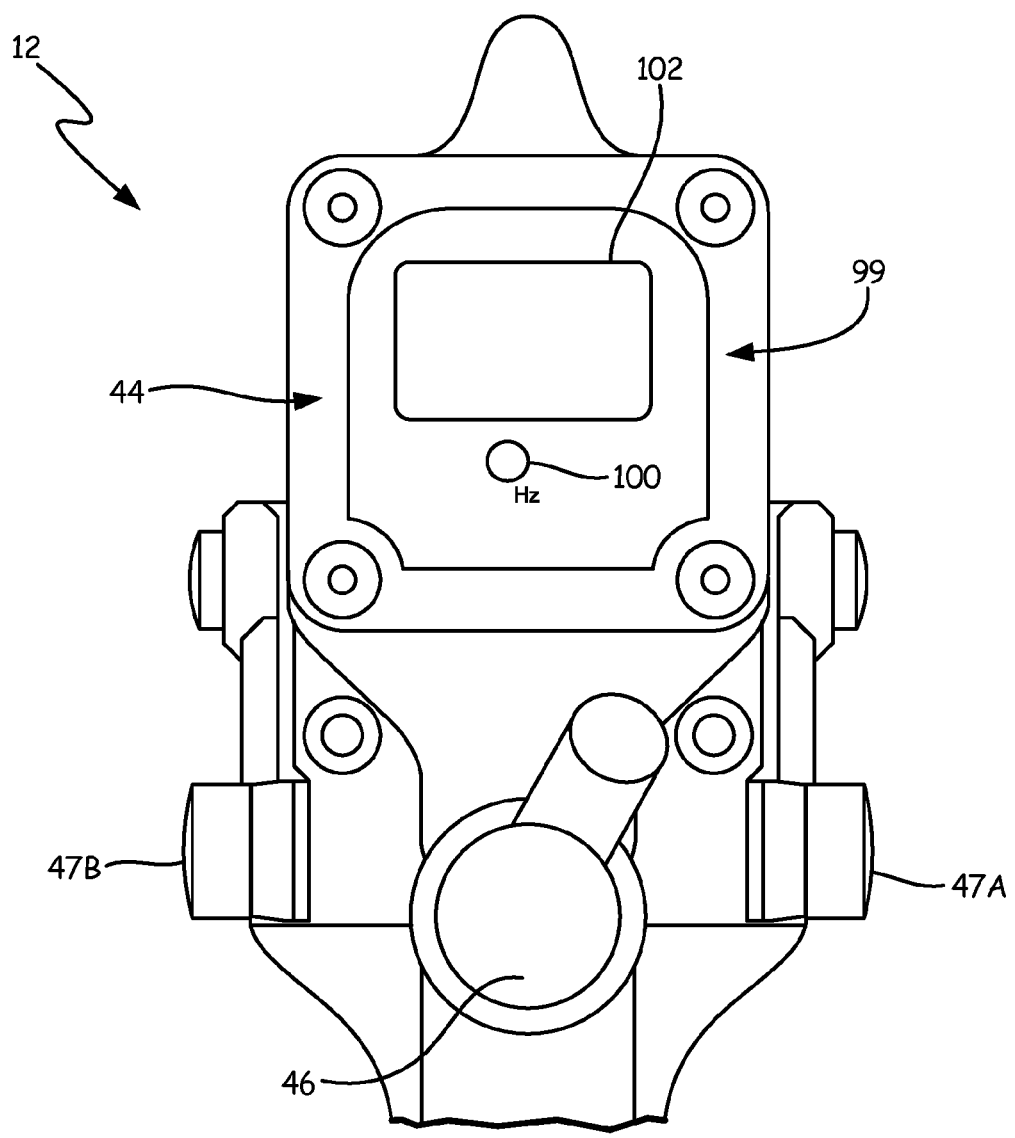
FIG. 4 is a rear elevation view of an embodiment of the electrostatic spray gun of FIG. 3 showing an alternator indicator and a display screen.
Figure 5:
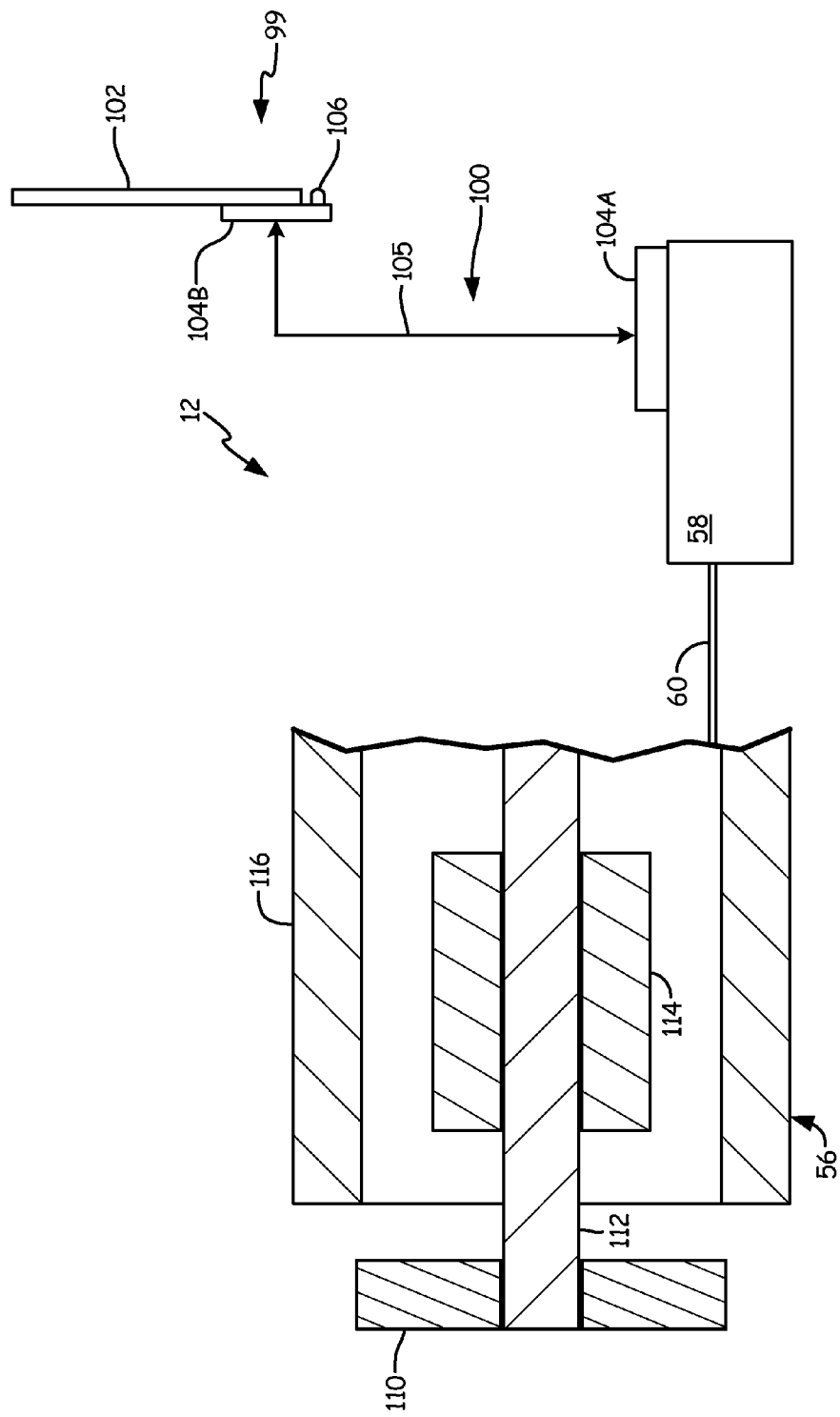
FIG. 5 is a schematic of an embodiment of the electrostatic spray gun of FIG. 3 showing components of an alternator and an alternator indicator.
Figure 6:
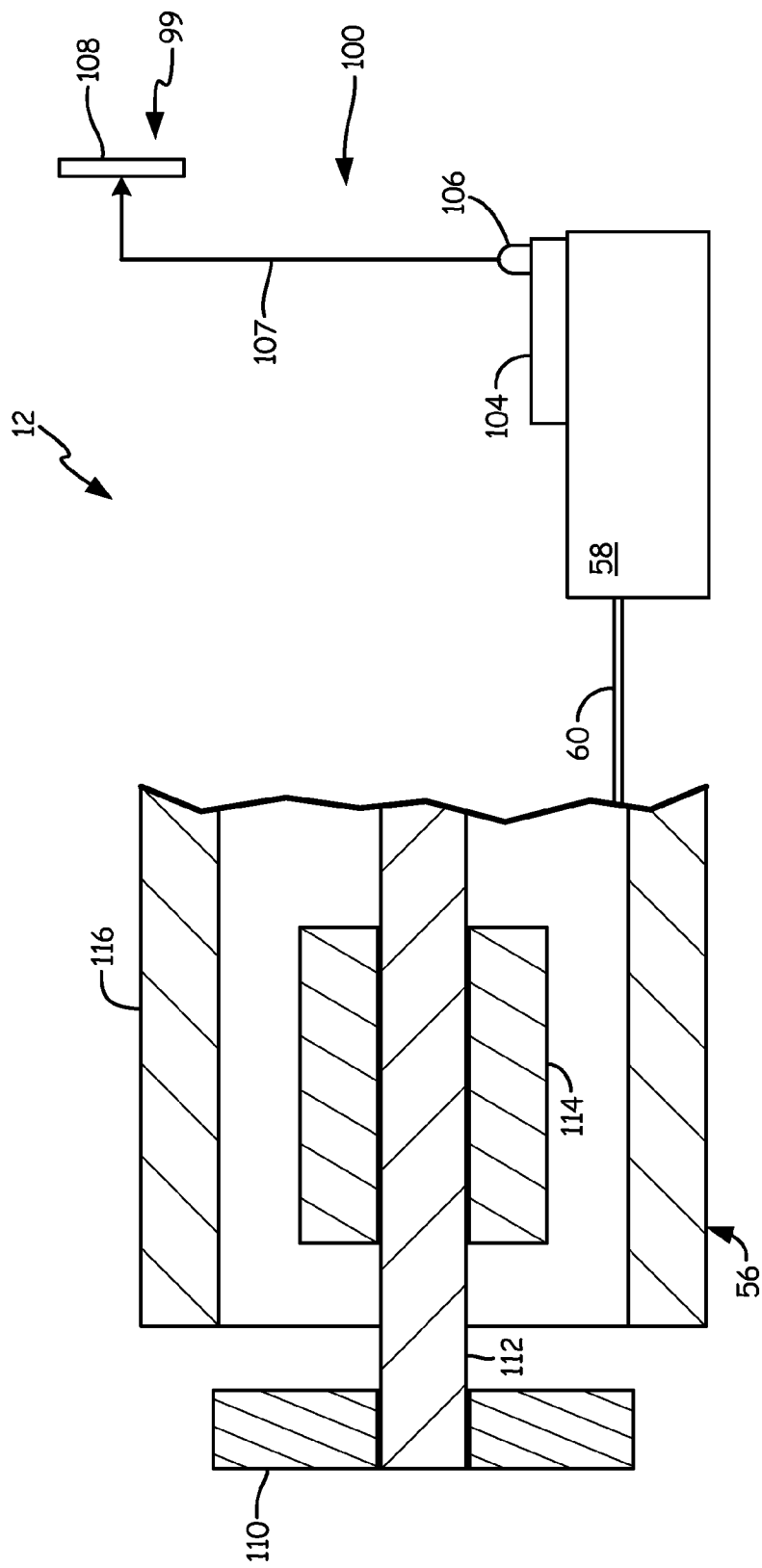
FIG. 6 is a schematic of another embodiment of the electrostatic spray gun of FIG. 3 showing components of an alternator and an alternator indicator.

According to techniques of this disclosure, an electrostatic spray gun includes an alternator that generates electrical energy that is received by an electrode to produce an ionizing current for electrostatic spraying. An indicator, visible externally from the electrostatic spray gun, is configured to output an indication of an operating condition of the alternator that corresponds to one of insufficient electrical energy for efficient electrostatic spraying, sufficient electrical energy for efficient electrostatic spraying, and excess rotational speed of an alternator rotor that can cause unnecessary wear to the alternator components. For instance, the electrostatic spray gun can cause an indicator light to emit a yellow color when an alternator frequency is below an optimal frequency range, a green color when the alternator frequency is within the optimal frequency range, and a red color when the alternator frequency is greater than the optimal frequency range. In this way, techniques described herein can enable an operator to adjust the alternator frequency (e.g., via a pressurized air source that powers the alternator) to achieve efficient electrostatic spraying, while minimizing undue wear to components of the electrostatic spray gun. FIGS. 1-3 of the present disclosure describe an electrostatic spray gun in which an alternator indicator may be used. FIGS. 4-6 describe various aspects, embodiments and benefits of the alternator indicator.

FIG. 1 is a schematic of electrostatic spray system 10 showing electrostatic spray gun 12 connected to fluid supply 14 and discharging onto target 16. Pump 18 is coupled to fluid supply 14 and provides pressurized fluid to spray gun 12 via hose 20. Spray gun 12 is also connected to a source of pressurized air (not shown) via hose 22. Target 16 is connected to ground, such as by being suspended from rack 24. Electrostatic spray system 10 is described with reference to a fluid spraying system, but other coating materials may be used with the present invention, such as powders and the like. Although FIGS. 1-3 are described with specific reference to an air-assist system, the present invention may also be used with an air-spray system.

Operator 26 positions spray gun 12 in close proximity to target 16, approximately 0.5 meters or less. Upon actuation of a trigger on spray gun 12, pressurized air is supplied to a turbine within spray gun 12 that powers an alternator to generate electrical power. The electrical power is supplied to an electrode near the spray tip of spray gun 12. Thus, electrical field EF is produced between the electrode and target 16. Electrostatic spray system 10 is grounded at various points. For example, ground wire 28 and/or conductive air hose 22 may ground spray gun 12. Other grounding wires and conductive materials may be used throughout electrostatic spray system 10 to provide grounding. Simultaneously, actuation of the trigger allows pressurized fluid from pump 18 through the spray tip whereby atomized particles of the fluid become charged in electrical field EF. The charged particles are thus drawn to target 16, which is grounded. Target 16 is suspended via rack 24 and the electrically charged fluid particles wrap around target 16, thereby significantly reducing overspray. FIG. 2 is a perspective view of electrostatic spray gun 12 of FIG. 1 showing gun barrel 30 connected to handle body 32 and spray tip assembly 34. Handle 36 of handle body 32 is connected to air inlet 38, air exhaust 40 and fluid inlet 42. Housing 44 of handle body 32 is connected to gun barrel 30. Air control 46 is connected to an on/off valve (see air needle 66 in FIG. 3) within housing 44 and controls flow of compressed air from air inlet 38 to the components of spray gun 12. Air adjusters 47A and 47B control the flow of air from the aforementioned on/off valve to spray tip assembly 34. Trigger 48 is connected to a fluid valve (see fluid needle 74 in FIG. 3) within gun barrel 30 and is configured to control flow of pressurized fluid from fluid inlet 42 through spray tip assembly 34 via fluid tube 50. Air control 46 controls the flow of air to the alternator. The air then exits spray gun 12 at exhaust 40.

Actuation of trigger 48 simultaneously allows compressed air and pressurized fluid to spray tip assembly 34. Some of the compressed air is used to influence the flow of fluid from spray tip assembly 34 and thereby exits spray gun 12 at ports 52A and 52B, or other such ports. In air-spray systems, some of the compressed air is also used to directly atomize the fluid as it exits the spray orifice. In both air-spray and air-assist systems, some of the compressed air is also used to rotate an alternator that provides power to electrode 54 and leaves spray gun 12 at exhaust 40. The alternator and an associated power supply for electrode 54 are shown in FIG. 3.

FIG. 3 is an exploded view of electrostatic spray gun 12 of FIG. 2 showing alternator 56 and power supply 58 configured to be located within handle body 32 and gun barrel 30. Alternator 56 is connected to power supply 58 via ribbon cable 60. Alternator 56 couples to power supply 58 and, when assembled, alternator 56 fits into housing 44 and power supply 58 fits into gun barrel 30. Electricity generated by alternator 56 is transmitted to power supply 58. In air-assist systems, an electric circuit, including spring 62 and conductive ring 64, conveys the electric charge from power supply 58 to electrode 54 inside of spray tip assembly 34. Air-spray systems may have other electric circuits connecting the alternator to the electrode.

Air needle 66 and seal 68 comprise an on/off valve for control of compressed air through spray gun 12. Air control valve 46 includes air needle 66 that extends through housing 44 to trigger 48, which can be actuated to move seal 68 and control flow of compressed air from air inlet 38 through passages within handle body 32. Spring 70 biases seal 68 and trigger 48 to a closed position, while knob 72 may be adjusted to manipulate valve 46. With seal 68 opened, air from inlet 38 flows through the passages within handle body 32 to alternator 56 or spray tip assembly 34.

Fluid needle 74 comprises part of a fluid valve for control of pressurized fluid through spray gun 12. Actuation of trigger 48 also directly moves fluid needle 74, which is coupled to trigger 48 via cap 76. Spring 78 is positioned between cap 76 and trigger 48 to bias needle 74 to a closed position. Needle 74 extends through gun barrel 30 to spray tip assembly 34.

Spray tip assembly 34 includes seat housing 80, gasket 81, tip 82, air cap 84 and retainer ring 86. In air-assist systems, fluid needle 74 engages seat housing 80 to control flow of pressurized fluid from fluid tube 50 through to spray tip assembly 34. Gasket 81 seals between seat housing 80 and tip 82. Tip 82 includes spray orifice 87 that discharges pressurized fluid from seat housing 80. Electrode 54 extends from air cap 84. In air-assist systems, high pressure fluid is fed through spray orifice 87, from which electrode 54 is offset. Atomization occurs by passing the high pressure fluid through a small orifice. In air-spray systems, an electrode extends from a spray orifice such that the electrode and spray orifice are concentric. Low pressure fluid passes through a large spray orifice, and is atomized by impinging airflow from air cap 34. In either systems, air cap 84 includes ports, such as ports 52A and 52B (FIG. 2), that receive pressurized air to atomize and shape the flow of fluid from tip 82 based on setting of adjusters 47A and 47B. In other embodiments, gun 12 may operate without either of ports 52A and 52B, or may operate with only one of ports 52A and 52B.

Operation of alternator 56 under force of pressurized air provides electrical energy to power supply 58 that in turn applies a voltage to electrode 54. Electrode 54 generates electrical field EF (FIG. 1) that applies a charge to atomized fluid originating from tip 82. The Corona effect produced by electrical field EF carries the charged fluid particles to the target intended to be coated with the fluid. Retainer ring 86 maintains air cap 84 and tip 82 assembled with gun barrel 30, while seat housing 80 is threaded into gun barrel 30.

FIG. 4 is a rear elevation view of an embodiment of electrostatic spray gun 12 of FIG. 3 showing alternator indicator 99. As illustrated, spray gun 12 includes air control 46, air adjusters 47A-47B, and housing 44, as is described above with respect to FIGS. 1-3. Alternator indicator 99, in this example, includes optical indicator 100 and display screen 102 that are disposed at housing 44 and viewable externally from spray gun 12. In general, alternator indicator 99 can include any indicator capable of indicating an operating condition of alternator 56, such as an optimal and/or suboptimal operating condition for electrostatic spraying, as is further described below. For instance, optical indicator 100 can include a light emitting diode (LED), an incandescent light, or other type of optical output capable of displaying one or more of varying colors, intensities, flashing patterns and/or speeds that can indicate an operating condition of alternator 56 (FIG. 3).

Display screen 102 can be configured to display configuration and/or operating condition information associated with spray gun 12. Examples of display screen 102 can include a liquid crystal display (LCD), LED display, organic light-emitting diode (OLED) display, segment display, pixelated grid display, or other type of electronic display device. Display screen 102 can display information such as a frequency of an alternating current generated by alternator 56, a rotational speed of a rotor of alternator 56, or other information associated with operation and/or maintenance of spray gun 12. In some examples, spray gun 12 may not include optical indicator 100, but may output an indication of an operating condition of alternator 56 at display 102. In general, while illustrated in the example of FIG. 4 as including both optical indicator 100 and display screen 102, in other examples, alternator indicator 99 can include one or more of optical indicator 100 and display screen 102. For instance, in certain examples, alternator indicator 99 can include optical indicator 100 but not display screen 102. In other examples, such as the example of FIG. 4, alternator indicator 99 can include both optical indicator 100 and display screen 102.

FIG. 5 is a schematic of an embodiment of electrostatic spray gun 12 of FIG. 3 showing components of alternator 56 and alternator indicator 99. As illustrated, spray gun 12 includes alternator 56, power supply 58, ribbon cable 60, alternator indicator 99, controller 104A, and controller 104B. Alternator indicator 99 includes optical indicator 100, which in this embodiment includes indicator light 106 and optical output 108. Alternator 56 includes impeller 110, shaft 112, rotor 114, and stator 116.

Impeller 110, shaft 112, rotor 114, and stator 116 can be disposed within an alternator housing (not illustrated). Rotor 114 is mounted on shaft 112 and inserted within an inner radius of stator 116. Shaft 112 is free to rotate, such that rotor 114 mounted on shaft 112 can rotate within stator 116. In operation, compressed air is directed into the alternator housing to induce rotation of impeller 110, and hence shaft 112 and rotor 114. As rotor 114 rotates within stator 116, an alternating electrical current is generated and supplied to power supply 58 via ribbon cable 60. The frequency of the alternating current is related to the rotational speed of rotor 114 within stator 116. As the rotational speed of rotor 114 increases, the frequency of the resulting alternating current increases. Similarly, as the rotational speed of rotor 114 decreases, the frequency of the resulting alternating current decreases. Accordingly, the frequency of the alternating current generated by alternator 56 can be representative of the rotational speed of rotor 114 within stator 116. Additionally, the voltage created at electrode 54 (FIG. 3) is related to the frequency of the alternating current supplied by alternator 56 to power supply 58. Low rotational speeds of rotor 114 will not fully power spray gun 12, and increasing rotor speed will correspondingly increase voltage at electrode 34, up to a maximum voltage at a full power. Increasing rotor speeds above this point will not provide additional power. Peak efficiency is obtained by driving rotor 114 to full power (but not beyond), so as generate maximum voltage at electrode 54 to ionize particles during electrostatic spraying. Power supply 58 can include, in certain examples, an alternating current to direct current converter to convert the alternating current received from alternator 56 to direct current that is supplied to electrode 54 to induce the voltage for electrostatic spraying (e.g., a 20-100 kV voltage). In some examples, power supply 58 can include a boost circuit to increase the voltage supplied to electrode 54.

Controller 104A is coupled to alternator 56 via power supply 58 and/or ribbon cable 60. That is, while in the example of FIG. 5 controller 104A is coupled to alternator 56 via power supply 58, in other examples, controller 104A can be coupled directly to alternator 56, such as via ribbon cable 60. In some examples, controller 104A can be part of power supply 58. For instance, controller 104A can be configured, in certain examples, to control one or more operations of power supply 58, such as to modulate one or more active switches of power supply 58. Display 102 and indicator light 106 are each coupled to controller 104B (e.g., electrically coupled). Controller 104B is coupled (e.g., electrically coupled, communicatively coupled via one or more network connections, and the like) to controller 104A via coupling 105. Controllers 104A-104B (collectively referred to herein as "controllers 104") can be configured to control operation of alternator indicator 99 to output a representation of a rotational speed of rotor 114 (and hence a frequency of the alternating current generated by alternator 56) to indicate that an operating condition of alternator 56 corresponds to an optimal and/or suboptimal condition for electrostatic spraying.

Controllers 104 can be configured to implement functionality and/or process instructions for execution within spray gun 12. For instance, controllers 104 can be capable of processing instructions stored in one or more storage devices of spray gun 12 (not illustrated) to output a representation of a rotational speed of rotor 114. Examples of controllers 104 can include any one or more of a processor, a microprocessor, a digital signal processor (DSP), an application specific integrated circuit (ASIC), a field-programmable gate array (FPGA), or other equivalent discrete or integrated logic circuitry. Examples of storage devices can include volatile and/or non-volatile memory. For instance, such storage devices can include any one or more of random access memories (RAM), dynamic random access memories (DRAM), static random access memories (SRAM), and other forms of volatile memories. Similarly, storage devices can include non-volatile storage elements, such as magnetic hard discs, optical discs, floppy discs, flash memories, or forms of electrically programmable memories (EPROM) or electrically erasable and programmable (EEPROM) memories. In certain examples, as in the example of FIG. 6 described below, spray gun 12 can include a single controller 104. That is, functionality attributed to controllers 104 and distributed among controllers 104 can, in certain examples, be performed by a single controller 104. Similarly, while illustrated in the example of FIG. 5 as including two controllers 104, in other examples, spray gun 12 can include more than two controllers 104. In such examples, functionality attributed to controllers 104 can be distributed among the multiple controllers 104.

As illustrated, alternator indicator 99 can include indicator light 106. In the example of FIG. 5, indicator light 106 is coupled (e.g., electrically coupled) to controller 104B. Indicator light 106, in this example, is disposed at housing 44 and viewable externally from housing 44. Indicator light 106 can be an LED, an incandescent light, or other type of optical indicator capable of emitting one or more of varying colors, intensities, flashing patterns and/or speeds that can indicate an operating condition of alternator 56.

According to techniques of this disclosure, controllers 104 can be configured to output, via alternator indicator 99, an indication of an operating condition of alternator 56. For example, controllers 104 can output, via alternator indicator 99, an indication that an operating condition of alternator 56 corresponds to a suboptimal operating condition for electrostatic spraying. Similarly, controllers 104 can output an indication that an operating condition of alternator 56 corresponds to an optimal and/or range of optimal operating conditions for electrostatic spraying.

As one example, a suboptimal operating condition can correspond to a frequency of alternating current generated by alternator 56 that is included within a range of frequencies corresponding to insufficient electrical energy for efficient electrostatic spraying (e.g., insufficient to create a voltage at electrode 54 with magnitude that enables efficient electrostatic spraying). As another example, a suboptimal operating condition can correspond to a frequency of alternating current generated by alternator 56 that is included within a range of frequencies corresponding to excess rotational speed of rotor 114 that can cause undue wear on components of alternator 56. An optimal operating condition can correspond to a frequency of alternating current that is within a range of frequencies corresponding to sufficient electrical energy for efficient electrostatic spraying (e.g., sufficient to create a voltage at electrode 54 with magnitude that enables efficient electrostatic spraying). In some examples, the ranges of frequencies can be mutually exclusive, such that a maximum frequency of the range of frequencies corresponding to insufficient electrical energy is less than a minimum frequency of the range of frequencies corresponding to sufficient electrical energy, and a maximum frequency of the range of frequencies corresponding to sufficient electrical energy is less than a minimum frequency of the range of frequencies corresponding to excess rotational speed of rotor 114.

In operation, controllers 104 can determine the frequency of the alternating current generated by alternator 56 by, for example, determining the frequency of zero-crossings of the amplitude of the alternating current. Because, as discussed above, the frequency of the alternating current is related to the rotational speed of rotor 114, the frequency of the alternating current can be considered a representation of the rotational speed of rotor 114. As one example, controller 104A can receive an indication of the rotational speed of rotor 114 (e.g., via frequency information of alternating current generated by alternator 56), and can determine whether the rotational speed of rotor 114 (and/or the frequency of the alternating current) corresponds to a suboptimal and/or optimal condition for electrostatic spraying. In such an example, controller 104A can output an indication of the determined operating condition to controller 104B via coupling 105, which in turn can cause alternator indicator 99 (i.e., indicator light 106 and/or display 102) to output the indication of the operating condition. As another example, controller 104A can receive an indication of the rotational speed of rotor 114 and can output the rotational speed information (and/or alternating current frequency information) to controller 104B via coupling 105. In such an example, controller 104B can determine whether the rotational speed of rotor 114 (and/or the frequency information) corresponds to a suboptimal and/or optimal condition for electrostatic spraying, and can cause alternator indicator 99 to output the representation of the operating condition.

Controllers 104 can output an indication that an operating condition of alternator 56 corresponds to a suboptimal operating condition by, for example, outputting a first indication that a frequency of the alternating current generated by alternator 56 is included within a first range of frequencies corresponding to insufficient electrical energy for efficient electrostatic spraying. The first range of frequencies can include, in one example, frequencies less than 400 Hz. Controllers 104 can output a second indication, different than the first indication, that an operating condition of alternator 56 corresponds to a range of optimal operating conditions for electrostatic spraying. For instance, controllers 104 can output the second indication in response to determining that the frequency of the alternating current generated by alternator 56 is included within a second range of frequencies corresponding to sufficient electrical energy for efficient electrostatic spraying, such as a range of frequencies from 400 Hz to 750 Hz. In some examples, controllers 104 can output a third indication, different than both the first and second indications, indicating that an operating condition of alternator 56 corresponds to a suboptimal operating condition by, for example, outputting the third indication in response to determining that the frequency of alternating current generated by alternator 56 is included within a third range of frequencies corresponding to excess rotational speed of rotor 114. As an example, the third range of frequencies can include frequencies greater than 750 Hz.

Controllers 104 can output one or more of the first indication (e.g., associated with the range of frequencies corresponding to insufficient electrical energy), the second indication (e.g., associated with the range of frequencies corresponding to sufficient electrical energy), and the third indication (e.g., associated with the range of frequencies corresponding to excess rotational speed of rotor 114) via alternator indicator 99. For instance, controllers 104 can cause indicator light 106 (e.g., an LED) to emit a color indicative of the rotational speed of rotor 114 (e.g., based on the frequency of the alternating current). For example, controllers 104 can cause indicator light 106 to emit a first color (e.g., yellow) in response to determining that the frequency of the alternating current generated by alternator 56 is within the first range of frequencies (e.g., below 400 Hz), a second color (e.g., green) in response to determining that the frequency of the alternating current is within the second range of frequencies (e.g., a range from 400 Hz to 750 Hz), and a third color (e.g., red) in response to determining that the frequency of the alternating current is within the third range of frequencies (e.g., greater than 750 Hz).

In other examples, controllers 104 can output the representation of the rotational speed of rotor 114 via alternator indicator 99 by causing indicator light 106 to flash at varying speeds, with varying patterns, or to emit one or more colors with varying intensity. For instance, controllers 104 can cause indicator light 106 to flash at a first speed and/or pattern in response to determining that the frequency of the alternating current generated by alternator 56 is within a first range of frequencies, at a second speed and/or pattern in response to determining that the frequency of the alternating current is within a second range of frequencies, and at a third speed and/or pattern in response to determining that the frequency of the alternating current is within a third range of frequencies. In yet other examples, controllers 104 can output the representation of the rotational speed of rotor 114 via display screen 102 of alternator indicator 99. In general, controllers 104 can output the representation of the rotational speed of rotor 114 (and hence an indication of the operating condition of alternator 56) via alternator indicator 99 in any manner that enables the various operating conditions to be discerned from the output.

Accordingly, controllers 104 can be configured to output a representation of a rotational speed of rotor 114 (and hence the frequency of the alternating current generated by alternator 56) that can indicate that an operating condition of alternator 56 is optimal and/or suboptimal. In this way, techniques of this disclosure can enable an operator of spray gun 12 to adjust the alternator frequency (via, for example, a pressurized air supply that powers alternator 56), to enable the operator to achieve an operating condition corresponding to efficient electrostatic spraying while helping to minimize wear to components of alternator 56, such as bearings for shaft 112, that can result from excess rotational speed of rotor 114.

FIG. 6 is a schematic of another embodiment of electrostatic spray gun 12 of FIG. 3 showing components of alternator 56 and alternator indicator 99. As illustrated, spray gun 12 includes alternator 56, power supply 58, ribbon cable 60, alternator indicator 99, controller 104, and optical coupling 107. Alternator indicator 99 optical indicator 100 which, in this embodiment, includes indicator light 106 and optical output 108. Indicator light 106, in this example, is positioned within housing 44 (FIG. 3) and coupled (e.g., electrically coupled) to controller 104. Optical output 108 is positioned at housing 44 and viewable externally from spray gun 12. Optical output 108 can be an aperture, window, or other optical output capable of emitting light received from indicator light 106 via optical coupling 107 (e.g., optical cable).

Controller 104 can receive an indication of a rotational speed of rotor 114 (e.g., via frequency information of alternating current generated by alternator 56), and can output a representation of the rotational speed of rotor 114 (and/or the frequency information) via indicator light 106 to indicate an operating condition of alternator 56. In operation, light emitted by indicator light 106 is carried by optical coupling 107 to optical output 108, which is viewable externally from spray gun 12. Accordingly, spray gun 12 can be configured to output an indication that an operating condition of alternator 56 corresponds to one or more of a suboptimal and an optimal operating condition for electrostatic spraying. In this way, techniques of this disclosure can enable efficient electrostatic spraying while helping to minimize undue wear to components of spray gun 12 that can result from excess rotational speed of rotor 114 due to, for example, excess air pressure that powers generator 56 (e.g., via impeller 110).

Although the present invention has been described with reference to preferred embodiments, workers skilled in the art will recognize that changes may be made in form and detail without departing from the spirit and scope of the invention.

The invention claimed is:

1. An electrostatic spray gun comprising:
    a spray tip assembly;
    an alternator comprising:
        a stator having an inner diameter and an outer diameter; and
        a rotor disposed within the inner diameter of the stator and configured to rotate within the stator to cause the alternator to generate alternating electrical current;
    an electrode coupled to receive electrical energy from the alternator, the electrode positioned proximate the spray tip assembly; and
    at least one controller coupled to the alternator, the at least one controller configured to output at least one representation of a rotational speed of the rotor;
    wherein the at least one representation of the rotational speed of the rotor comprises a frequency of the alternating current generated by the alternator.

2. The electrostatic spray gun of claim 1, wherein the representation of the rotational speed of the rotor comprises an indication of the frequency of the alternating current generated by the alternator.

3. The electrostatic spray gun of claim 2, wherein the indication of the frequency of the alternating current comprises:
    a first indication that the frequency of the alternating current is included within a first range of frequencies corresponding to insufficient electrical energy for electrostatic spraying;
    a second indication that the frequency of the alternating current is included within a second range of frequencies corresponding to sufficient electrical energy for electrostatic spraying; and
    a third indication that the frequency of the alternating current is included within a third range of frequencies corresponding to excess rotational speed of the rotor.

4. The electrostatic spray gun of claim 1, further comprising:
    an optical indicator light coupled to the at least one controller,
    wherein the at least one controller is configured to output the representation of the rotational speed of the rotor via the optical indicator light.

5. The electrostatic spray gun of claim 4, wherein the optical indicator light comprises a light emitting diode (LED).

6. The electrostatic spray gun of claim 5, further comprising:
    a spray gun housing that surrounds at least the alternator, the at least one controller, and the optical indicator light; and
    an optical output disposed at the spray gun housing and optically coupled to the optical indicator light.

7. The electrostatic spray gun of claim 6, wherein the optical output is optically coupled to the optical indicator light via optical fiber.

8. The electrostatic spray gun of claim 4,
    wherein the at least one controller comprises at least a first controller and a second controller, the first controller coupled to the second controller,
    wherein the first controller is coupled to the alternator to receive an indication of the rotational speed of the rotor, and
    wherein the second controller is configured to receive the indication of the rotational speed of the rotor from the first controller and to output the representation of the rotational speed via the optical indicator light.

9. The electrostatic spray gun of claim 4,
wherein the representation of the rotational speed of the rotor comprises an indication of a frequency of the alternating current generated by the alternator,
wherein the at least one controller is configured to output the representation of the rotational speed of the rotor via the optical indicator light by at least being configured to:
cause the optical indicator light to emit a first color in response to determining that the frequency of the alternating current is included within a first range of frequencies corresponding to insufficient electrical energy for electrostatic spraying;
cause the optical indicator light to emit a second color in response to determining that the frequency of the alternating current is included within a second range of frequencies corresponding to sufficient electrical energy for electrostatic spraying; and
cause the optical indicator light to emit a third color in response to determining that the frequency of the alternating current is included within a third range of frequencies corresponding to excess rotational speed of the rotor.

10. The electrostatic spray gun of claim 9,
wherein a maximum frequency from the first range of frequencies is less than a minimum frequency from second range of frequencies, and
wherein a maximum frequency from the second range of frequencies is less than a minimum frequency from the third range of frequencies.

11. The electrostatic spray gun of claim 9,
wherein the first color comprises yellow,
wherein the second color comprises green, and
wherein the third color comprises red.

12. The electrostatic spray gun of claim 1, further comprising:
a spray gun housing that surrounds at least the alternator and the at least one controller; and
a display screen disposed at the spray gun housing and coupled to the at least one controller,
wherein the at least one controller is configured to output the representation of the rotational speed of the rotor via the display screen.

13. The electrostatic spray gun of claim 1,
wherein the indication of the frequency of the alternating current comprises an indication that the frequency of the alternating current corresponds to a suboptimal operating condition for electrostatic spraying.

14. An electrostatic spray gun comprising:
a housing;
an air-driven alternator disposed within the housing and comprising:
a stator having an inner diameter and an outer diameter; and
a rotor disposed within the inner diameter of the stator and configured to rotate within the stator to cause the alternator to generate alternating electrical current;
a spray tip assembly;
an electrode coupled to receive electrical energy from the alternator, the electrode positioned proximate the spray tip assembly; and
an indicator configured to output a representation of a rotational speed of the rotor;
wherein the representation of the rotational speed of the rotor comprises an indication of a frequency of the alternating current generated by the alternator.

15. The electrostatic spray gun of claim 14, wherein the indicator comprises an optical output disposed at the housing and capable of emitting light having a color indicative of the rotational speed of the rotor.

16. The electrostatic spray gun of claim 14, wherein the indicator comprises a light emitting diode (LED) disposed within the housing and capable of emitting a color indicative of the rotational speed of the rotor.

17. The electrostatic spray gun of claim 14, wherein the indicator comprises a display screen disposed at an exterior of the housing.

18. An electrostatic spray gun comprising:
a spray tip assembly;
an alternator comprising:
a stator having an inner diameter and an outer diameter; and
a rotor disposed within the inner diameter of the stator and configured to rotate within the stator to cause the alternator to generate alternating electrical current;
an electrode coupled to receive electrical energy from the alternator, the electrode positioned proximate the spray tip assembly;
at least one controller coupled to the alternator, the at least one controller configured to output a representation of a rotational speed of the rotor;
an optical indicator light coupled to the at least one controller, the optical indicator light comprising a light emitting diode (LED), wherein the at least one controller is configured to output the representation of the rotational speed of the rotor via the optical indicator light;
a spray gun housing that surrounds at least the alternator, the at least one controller, and the optical indicator light; and
an optical output disposed at the spray gun housing and optically coupled to the optical indicator light.

19. An electrostatic spray gun comprising:
a spray tip assembly;
an alternator comprising:
a stator having an inner diameter and an outer diameter; and
a rotor disposed within the inner diameter of the stator and configured to rotate within the stator to cause the alternator to generate alternating electrical current;
an electrode coupled to receive electrical energy from the alternator, the electrode positioned proximate the spray tip assembly;
at least one controller coupled to the alternator, the at least one controller configured to output a representation of a rotational speed of the rotor; and
an optical indicator light coupled to the at least one controller, wherein the at least one controller is configured to output the representation of the rotational speed of the rotor via the optical indicator light;
wherein the at least one controller comprises at least a first controller and a second controller, the first controller coupled to the second controller;
wherein the first controller is coupled to the alternator to receive an indication of the rotational speed of the rotor; and
wherein the second controller is configured to receive the indication of the rotational speed of the rotor from the first controller and to output the representation of the rotational speed via the optical indicator light.

20. An electrostatic spray gun comprising:
a spray tip assembly;
an alternator comprising:
- a stator having an inner diameter and an outer diameter; and
- a rotor disposed within the inner diameter of the stator and configured to rotate within the stator to cause the alternator to generate alternating electrical current;

an electrode coupled to receive electrical energy from the alternator, the electrode positioned proximate the spray tip assembly;
at least one controller coupled to the alternator, the at least one controller configured to output a representation of a rotational speed of the rotor; and
an optical indicator light coupled to the at least one controller, wherein the at least one controller is configured to output the representation of the rotational speed of the rotor via the optical indicator light;
wherein the representation of the rotational speed of the rotor comprises an indication of a frequency of the alternating current generated by the alternator; and
wherein the at least one controller is configured to output the representation of the rotational speed of the rotor via the optical indicator light by at least being configured to:
- cause the optical indicator light to emit a first color in response to determining that the frequency of the alternating current is included within a first range of frequencies corresponding to insufficient electrical energy for electrostatic spraying;
- cause the optical indicator light to emit a second color in response to determining that the frequency of the alternating current is included within a second range of frequencies corresponding to sufficient electrical energy for electrostatic spraying; and
- cause the optical indicator light to emit a third color in response to determining that the frequency of the alternating current is included within a third range of frequencies corresponding to excess rotational speed of the rotor.

21. An electrostatic spray gun comprising:
a spray tip assembly;
an alternator comprising:
- a stator having an inner diameter and an outer diameter; and
- a rotor disposed within the inner diameter of the stator and configured to rotate within the stator to cause the alternator to generate alternating electrical current;

an electrode coupled to receive electrical energy from the alternator, the electrode positioned proximate the spray tip assembly;
at least one controller coupled to the alternator, the at least one controller configured to output a representation of a rotational speed of the rotor;
a spray gun housing that surrounds at least the alternator and the at least one controller; and
a display screen disposed at the spray gun housing and coupled to the at least one controller;
wherein the at least one controller is configured to output the representation of the rotational speed of the rotor via the display screen.

* * * * *